(12) United States Patent
Zirkind

(10) Patent No.: US 9,445,208 B2
(45) Date of Patent: Sep. 13, 2016

(54) EMISSION OF A COMMENCEMENT SOUND AND A CONCLUSION SOUND

(71) Applicant: The United States of America, as represented by the Secretary of the Army, Washington, DC (US)

(72) Inventor: Naomi Esther Zirkind, Baltimore, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 132 days.

(21) Appl. No.: 14/476,778

(22) Filed: Sep. 4, 2014

(65) Prior Publication Data

US 2016/0073206 A1  Mar. 10, 2016

(51) Int. Cl.
| G10K 15/04 | (2006.01) |
| G10K 15/08 | (2006.01) |
| H04R 27/00 | (2006.01) |
| H04R 3/00 | (2006.01) |
| A63F 13/54 | (2014.01) |

(52) U.S. Cl.
CPC ............... *H04R 27/00* (2013.01); *A63F 13/54* (2014.09); *H04R 3/002* (2013.01)

(58) Field of Classification Search
None
See application file for complete search history.

(56) References Cited

U.S. PATENT DOCUMENTS

| 4,264,309 A | | 4/1981 | Brooksby | |
| 4,439,156 A | * | 3/1984 | Marshall | F41G 3/28 434/12 |
| 5,474,452 A | | 12/1995 | Campagnuolo | |
| 5,980,254 A | * | 11/1999 | Muehle | F41G 3/2655 434/11 |
| 6,251,011 B1 | * | 6/2001 | Yamazaki | A63F 13/04 434/17 |
| 6,361,439 B1 | * | 3/2002 | Kawamoto | A63F 13/00 381/17 |
| 6,995,707 B2 | | 2/2006 | Karabin et al. | |
| 7,927,102 B2 | | 4/2011 | Jones et al. | |
| 2002/0022508 A1 | * | 2/2002 | Ikariko | A63F 13/04 463/5 |
| 2002/0022518 A1 | * | 2/2002 | Okuda | A63F 13/08 463/36 |
| 2003/0223603 A1 | | 12/2003 | Beckman | |
| 2006/0236889 A1 | | 10/2006 | Bodley et al. | |
| 2013/0040268 A1 | | 2/2013 | Van der Walt et al. | |
| 2013/0041648 A1 | * | 2/2013 | Osman | H04S 7/302 381/300 |
| 2013/0236040 A1 | * | 9/2013 | Crawford | H04S 7/304 381/310 |

OTHER PUBLICATIONS

Lessig, Hugh, At Fort Eustis, leaders discuss futuristic training, Daily Press, http://articles.dailypress.com/2014-06-18/ news/dp-nws-army-industry-20140618__1__fort-eustis-defense-contractors-virtual-reality, Jun. 18, 2014.

* cited by examiner

*Primary Examiner* — Thang Tran
(74) *Attorney, Agent, or Firm* — Azza Jayaprakash

(57) ABSTRACT

Various embodiments associated with a commencement sound and a conclusion sound are described. The commencement sound can be a firing sound, such as a sound of a bullet exiting a rifle. The conclusion sound can be an impact sound, such as a sound of the bullet impacting a concrete wall. These sounds can replicate what it sounds like to have an experience around someone without actually subjecting that person to the experience.

20 Claims, 13 Drawing Sheets

EMISSION OF A COMMENCEMENT SOUND AND A CONCLUSION SOUND

GOVERNMENT INTEREST

The innovation described herein may be manufactured, used, imported, sold, and licensed by or for the Government of the United States of America without the payment of any royalty thereon or therefor.

BACKGROUND

During basic and advanced training, soldiers can be taught soldiering skills to make them more efficient and productive members of a military force. In one example, a soldier can be trained how to effectively drive a sports utility vehicle over rough terrain. However, this training can be limited if it does not properly simulate a real world situation for the soldier. Therefore, training can be tailored to vividly resemble a potential real world situation.

SUMMARY

In one embodiment, a system comprises a source speaker component and a destination speaker component. The source speaker component can be configured to emit a commencement sound that communicates an initiation of an object in travel. The destination speaker component can be configured to emit a conclusion sound that communicates a result of the object in travel. The source speaker component, the destination speaker component, or a combination thereof can be implemented, at least in part, by way of hardware.

In one embodiment, a system comprises a source speaker component, a destination speaker component, and a housing. The source speaker component can emit a commencement sound that communicates an initiation of a first object in travel. The destination speaker component can emit a conclusion sound that communicates a result of a second object in travel, where the first object in travel and the second object in travel are not the same object in travel. The housing can retain the source speaker component and the destination speaker component.

In one embodiment, a non-transitory computer-readable medium is configured to store computer-executable instructions that when executed by a processor, cause the processor to perform a method. The method can comprise identifying an initiation command entered upon a graphical user interface for an audible sequence. The method can also comprise causing implementation of the audible sequence in response to identifying the initiation command, where the audible sequence comprises a firing audible portion and an impact audible portion.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
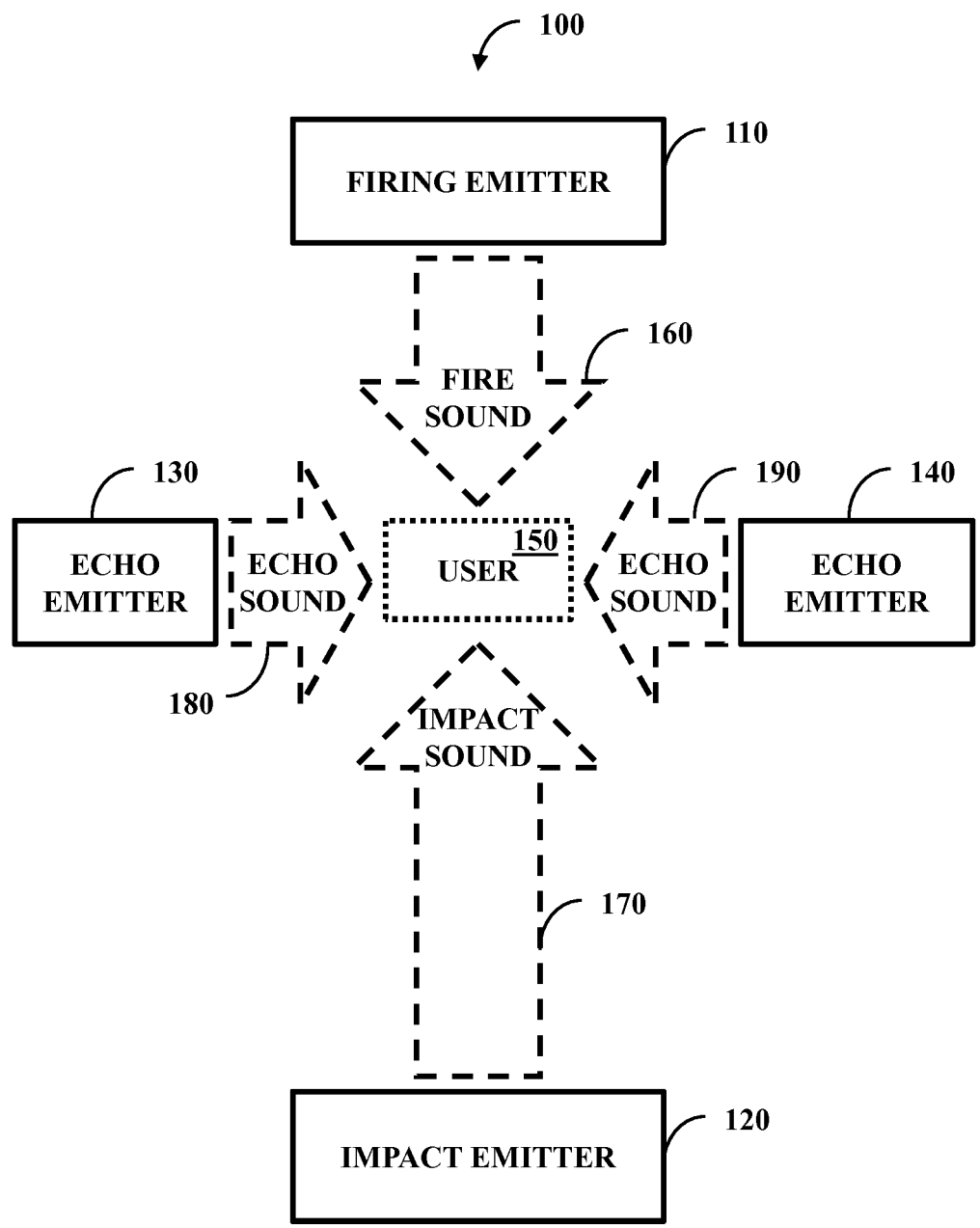
FIG. 1 illustrates one embodiment of a system comprising a firing emitter, an impact emitter, and two echo emitters.

Various sounds can be used to recreate a real-world experience, such as a commencement sound (e.g., firing sound), a conclusion sound (e.g., impact sound), and a reverberation sound. These sounds can be realistic, high fidelity sounds used in a realistic location for training purposes, therapy purposes, entertainment purposes, etc. For example, using gunfight sounds in soldier or police training can make the training more vivid and authentic, can better prepare soldiers and police for stressful environments they may encounter, etc. However, practicing these aspects can have the benefit of not actually placing the soldiers and police in danger and not using actual weapons that can be costly.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action (s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions, and/or behave in a desired manner. The instructions may be embodied in various forms including routines, algorithms, modules, methods, threads, and/or programs including separate applications or code from dynamically linked libraries.

FIG. 1 illustrates one embodiment of a system 100 comprising a firing emitter 110, an impact emitter 120, and two echo emitters 130 and 140. While two echo emitters 130 and 140 are shown, more or less echo emitters can be used. The emitters 110-140 can work together to provide a sound experience that is realistic for a user 150. In one example, the sound experience can be of a bullet being fired in the general vicinity of the user. The firing emitter 110 can emit a fire sound 160 that replicates a sound of the bullet leaving a rifle. The impact emitter 120 can emit an impact sound 170 that replicates a sound of the bullet impacting a target such as a hillside. The echo emitters 130 and 140 can produce echo sounds 180 and 190, respectively. Example echo sounds 180 and/or 190 can include a sound of a bullet passing by the head of the user 150, reverberations from the rifle, and/or resonance from the bullet impacting the target. Thus, various parts of a sound experience can be produced by the system 100.

Figure 2:
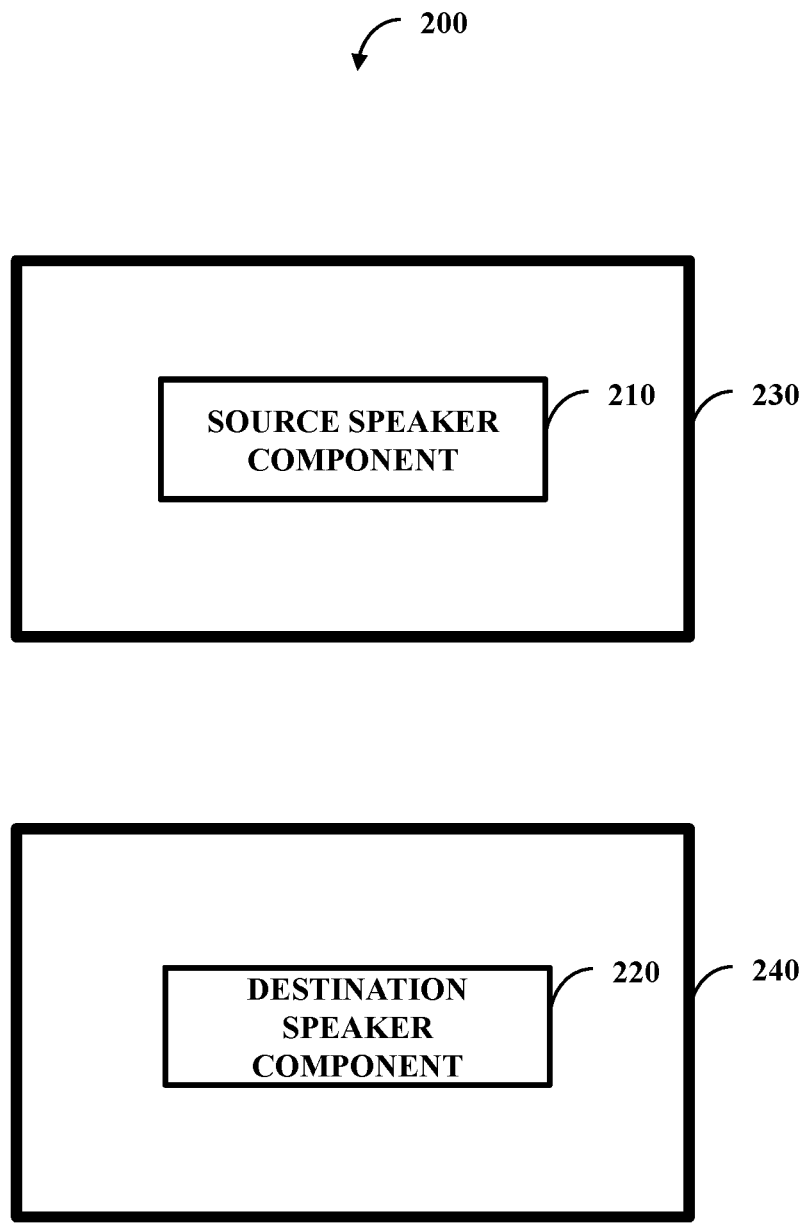
FIG. 2 illustrates one embodiment of a system comprising a source speaker component and a destination speaker component.

FIG. 2 illustrates one embodiment of a system 200 comprising a source speaker component 210 and a destination speaker component 220. In one embodiment, the source speaker component 210 and the destination speaker component 220 are retained by a housing. In one example, a first housing 230 retains the source speaker component 210 and a second housing 240, physically separate from the first housing 230, retains the destination speaker component 220. The source speaker component 210 (e.g., firing emitter 110 of FIG. 1) can be configured to emit a commencement sound (e.g., fire sound 160 of FIG. 1) that communicates an initiation of an object in travel. The destination speaker component 220 (e.g., the impact emitter 120 of FIG. 1) can be configured to emit a conclusion sound (e.g., impact sound 170 of FIG. 1) that communicates a result of the object in travel (e.g., the object in travel has an initiation of a single fire, but a result of multiple fragments impacting a target at different times). Thus, the system 200 can create a sound experience.

This sound experience can be used in various applications. In one example, the system 200 can create a sound experience for soldiers in training. While the soldiers are training they can hear sounds similar to that of combat, which can make them more prepared to perform while under the stresses of combat. Similarly, in actual combat operations the sound experience can be used to confuse an enemy force or in a law enforcement operation to confuse captors in a hostage situation. Additionally, the system 200 can be used in a therapeutic environment for soldiers, such as to aid in treatment of Post Traumatic Stress Disorder (PTSD) (e.g., use sounds to help patients disassociate sounds with trauma and to gradually desensitize patients from those sounds). In addition to military applications, aspects disclosed herein can be used in non-military applications. In one example, the system 200 can be used in an amusement park to make a ride seem more realistic. In this example, the source speaker component 210 can emit a sound of a lightning bolt coming from the sky and the destination speaker component 220 can emit a sound of the lightning bolt impacting a tree on the ground.

The source speaker component 210 can be retained by a first housing while the destination speaker component 220 can be retained by a second housing that is physically separate from the first housing. Therefore, the source speaker component 210 can be physically separate from the destination speaker component 220, such as being on different sides of a listener. The destination speaker component 220 can emit the conclusion sound after a start of emission of the commencement sound, as well as after the end of emission of the commencement sound. Therefore, the source speaker component 210 from the first housing can emit a sound of a weapon such as an artillery cannon firing a shell (e.g., from a speaker), and after a period of time the destination speaker component 220 from the second housing can emit a sound of the shell impacting a target such as an abandoned building.

In one embodiment, the first housing retains a transmitter (e.g., part of the source speaker component 210) while the second housing retains a receiver (e.g., part of the destination speaker component 220). The housings can each retain a transmitter and receiver. The transmitter can be configured to transmit to the receiver a message that provides information with regard to when in time the destination speaker component 220 should emit the conclusion sound (e.g., a set time, that the conclusion sound should be emitted after a set time, that no conclusion sound should be emitted, etc.). Therefore, the first housing and second housing can be in communication with one another. This communication can be used to coordinate time emission of the commencement sound and conclusion sound. In one example, the first housing can emit the commencement sound and send a message to the second housing that the commencement sound is emitted. The second housing can then emit the conclusion sound and send a message back to the first housing that the conclusion sound has been emitted. In response to receiving the message from the second housing, the first housing can emit another commencement sound (e.g., the same commencement sound, a different commencement sound, etc.).

In one embodiment, the destination speaker component is configured to monitor emission of the commencement sound to produce a monitor result. The destination speaker component 220 can be configured to decide a time to emit the conclusion sound based, at least in part, on the monitor result. The destination speaker component 220 can be configured to emit the conclusion sound at the time. Therefore, as opposed to directly communicating with one another, the destination speaker component 220 can determine on its own when to emit the conclusion sound based on when the commencement sound is emitted.

The source speaker component 210 and the destination speaker component 220 can share speaker hardware or be hardware independent of one another. In one example, the source speaker component 210 and the destination speaker component 220 have their own individual speakers and share a speaker (e.g., each component has its own speaker and then shares a speaker[[,]]; thus, each component can function with two physical speakers). In another example, a single speaker can be employed by both the source speaker component 210 and the destination speaker component 220.

Figure 3:
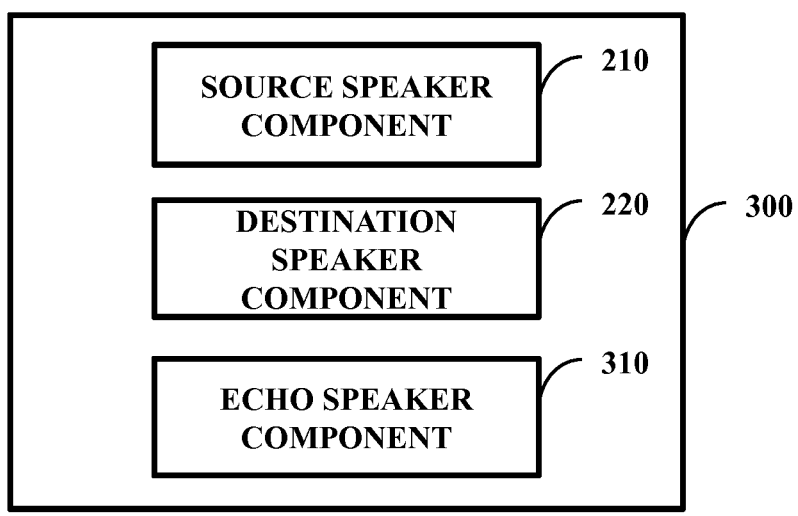
FIG. 3 illustrates one embodiment of a system comprising the source speaker component, the destination speaker component, and an echo speaker component.

FIG. 3 illustrates one embodiment of a system 300 comprising the source speaker component 210, the destination speaker component 220, and an echo speaker component 310. The echo speaker component 310 (e.g., the echo emitters 130 and 140 of FIG. 1) can be configured to emit a reverberation sound (e.g., echo sounds 180 and 190 of FIG. 1) that communicates the echo sound of the object in travel (e.g., an echo that would result from the impact of the object on a target after travel completion).

In one embodiment, the reverberation sound is emitted later in time from the conclusion sound. In one example, the reverberation sound is the reverberation from the initiation of the object in travel (e.g., sound of artillery cannon vibration), from the result of the object in travel (e.g., dirt hitting the ground dislodged from cannon shell hitting a hillside), or from a collateral action (e.g., sound of bodies leaping to the ground to take cover). Therefore, the reverberation sound can be emitted later in time from the commencement sound and/or the conclusion sound.

Figure 4:
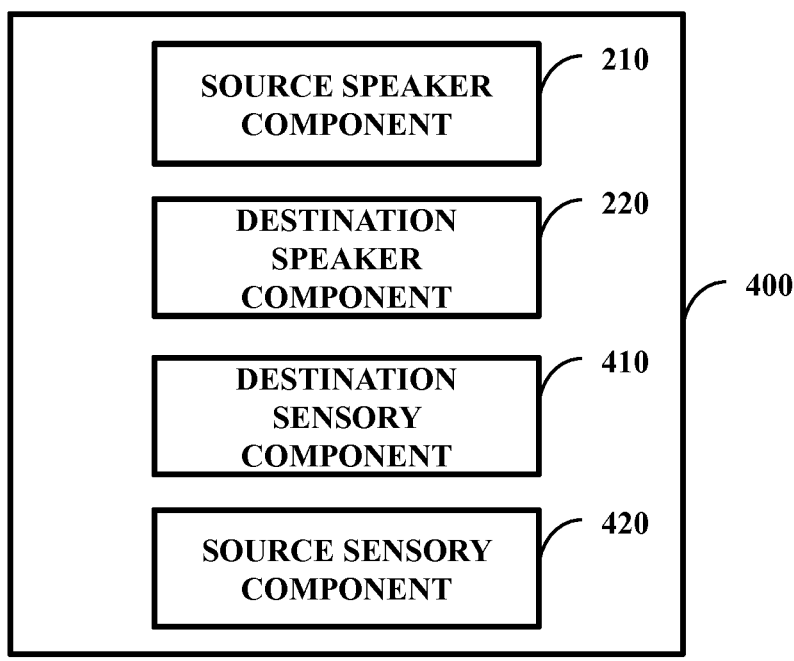
FIG. 4 illustrates one embodiment of a system comprising the source speaker component, the destination speaker component, a destination sensory component, and a source sensory component.

FIG. 4 illustrates one embodiment of a system 400 comprising the source speaker component 210, the destination speaker component 220, a destination sensory component 410, and a source sensory component 420. The destination sensory component 410 can be configured to emit a conclusion non-sound sensory emission that communicates the result of the object in travel. The source sensory component 420 can be configured to emit a commencement non-sound sensory emission that communicates the initiation of the object in travel. Non-sound sensory emissions can include visual emissions (e.g., light flashes), touch emissions (e.g., dirt flying into the air that contacts the user 150 of FIG. 1), smell emissions (e.g., odor of gunpowder), and/or taste emissions (e.g., smoke released with a particular flavor). These non-sound sensory emissions can be used to make the sound experience more realistic.

Figure 5:
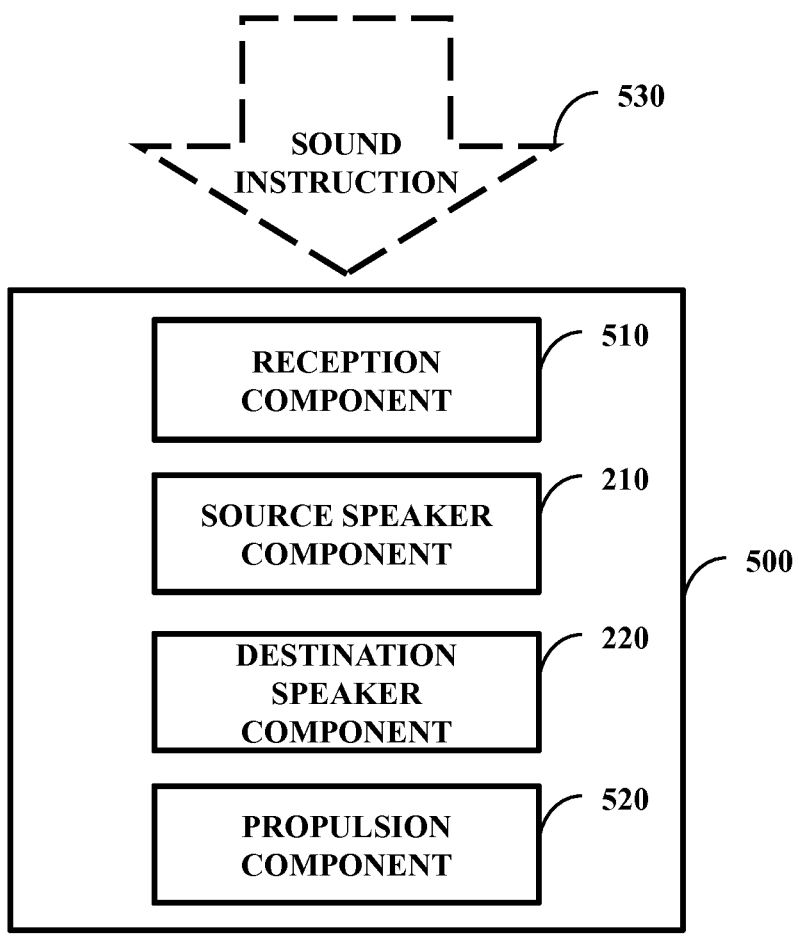
FIG. 5 illustrates one embodiment of a system comprising the source speaker component, the destination speaker component, a reception component, and a propulsion component.

FIG. 5 illustrates one embodiment of a system 500 comprising the source speaker component 210, the destination speaker component 220, a reception component 510, and a propulsion component 520. The reception component 510 can be configured to receive a sound instruction 530, where the source speaker component 210, the destination speaker component 220, or a combination thereof emit their respective sounds in accordance with the sound instruction 530. The sound instruction 530 can include a sound file for use and/or be an instruction to use a sound file (e.g., a sound file retained locally, a sound file that should be downloaded, etc.).

The propulsion component 520 can be configured to cause movement of a housing that retains at least part of the system 500 to a location that is based, at least in part, on the sound instruction 530. This movement of the system can be teleoperation (e.g., by way of an interface) or proactive (e.g., automatic). Thus, the system 500 can be mobile (e.g., employ wheels to drive, employ rotors to fly, employ a boat engine to travel by water, etc.). The sound instruction 530 can, for example, state that the sound should be emitted x feet from a right side of the user 150 of FIG. 1, where x is a real number. The propulsion component 520 can cause movement of the housing, such that a speaker of the source speaker component 210 and/or destination speaker component 220 is positioned x feet away from the right side of the user 150 of FIG. 1. As the user 150 of FIG. 1 moves, the housing can move along with her by way of the propulsion component 520. The housing can also be moved from a first location to a second location by the propulsion component 520 and remain in the second location for a set period of time.

Figure 6:
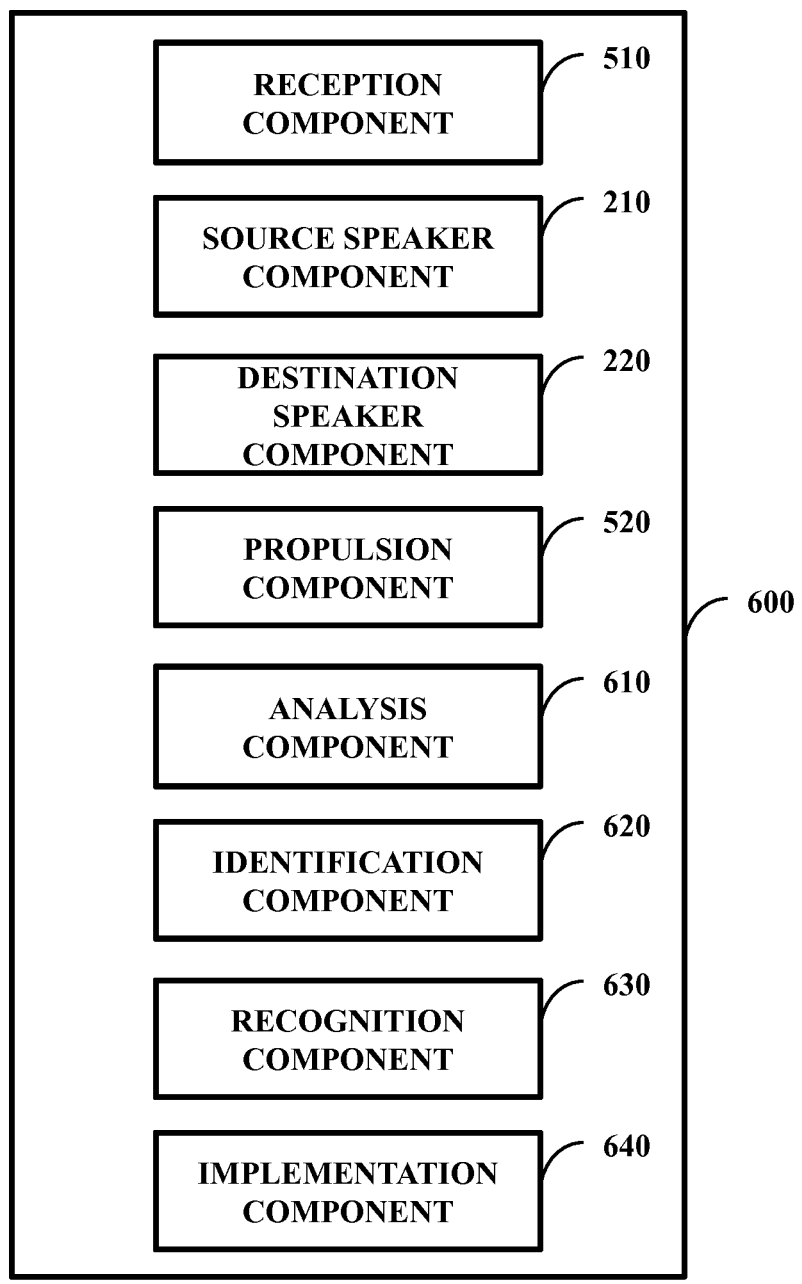
FIG. 6 illustrates one embodiment of a system comprising the source speaker component, the destination speaker component, the reception component, the propulsion component, an analysis component, an identification component, a recognition component, and an implementation component.

FIG. 6 illustrates one embodiment of a system 600 comprising the source speaker component 210, the destination speaker component 220, the reception component 510, the propulsion component 520, an analysis component 610, an identification component 620, a recognition component 630, and an implementation component 640. The analysis component 610 can be configured to analyze the sound instruction 530 of FIG. 5 to produce an analysis result (e.g., analysis of the sound instruction 530 of FIG. 5 occurs after reception by the reception component 510). The identification component 620 can be configured to identify a sound file to use from a sound file set of two or more sound files based on the analysis result (e.g., the analysis component 610 and the identification component 620 work together to determine which sound file the instruction is telling the system 600 to use for emission). The recognition component 630 can be configured to read the sound file from a non-transitory computer-readable medium (e.g., the computer-readable medium 820 discussed below) to produce a sound file result. The implementation component 640 can be configured to cause emission of the commencement sound, the conclusion sound, or a combination thereof in accordance with the sound file result.

In one example, the system 600 can retain a memory chip that retains a set of sound files as well as an internal clock. The sound instruction 530 of FIG. 5 can designate which sound file to play at a certain time and this can be recognized by the analysis component 610. In this example, the sound instruction 530 of FIG. 5 can be an instruction to play a commencement sound of an AK-47 firing. The identification component 620 can find an AK-47 sound file in the memory chip. More than one AK-47 sound file can exist and if the instruction does not specify, then the system 600 can use internal logic to select a sound file to use. Alternatively, if no AK-47 sound file exists on the memory chip, the system 600 can improvise (e.g., identify a similar sounding sound file) or send an error message. The AK-47 sound file can include commencement, conclusion, and/or reverberation sound information (e.g., as one file, as three separate files, etc.). Once identified, the recognition component 630 can find the AK-47 sound file and thus give the system 600 access to the AK-47 sound file. The implementation component 640 can cause emission of the appropriate sound (e.g., send an instruction to the source speaker component 210 to play an AK-47 commencement sound from the sound file).

Figure 7:
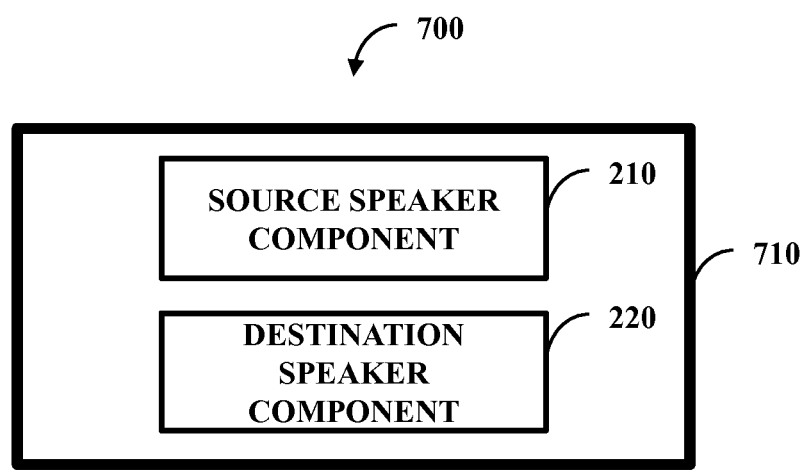
FIG. 7 illustrates one embodiment of a system comprising the source speaker component, the destination speaker component, and a housing.

FIG. 7 illustrates one embodiment of a system 700 comprising the source speaker component 210, the destination speaker component 220, and a housing 710. The housing 710 can function as the housing discussed above with regard to FIG. 5. The housing 710 can retain components disclosed herein, such as the source speaker component 210 and/or the destination speaker component 220 (e.g., the housing 710 can be a singular housing configured to retain the source speaker component 210 and the destination speaker component 220). Other example components that the housing 710 can retain, such as along with the source speaker component 210 and the destination speaker component 220, can be the analysis component 610 of FIG. 6, the identification component 620 of FIG. 6, the recognition component 630 of FIG. 6, and the implementation component 640 of FIG. 6.

The source speaker component 210 can be configured to emit a commencement sound that communicates an initiation of a first object in travel. The destination speaker component 220 can be configured to emit a conclusion sound that communicates a result of a second object in travel. Thus, a single system (e.g., the system 700) can retain the capability of functioning as a source and destination for sound.

In addition to the source speaker component 210 and the destination speaker component 220, the system 700 can comprise the echo speaker component 310 of FIG. 3. The echo speaker component 310 of FIG. 3 can be configured to emit a reverberation sound that communicates an echo of a third object in travel (e.g., the first object in travel, the second object in travel, and the third object in travel are all different objects). The housing 710 can retain the echo speaker component. Thus, a single system (e.g., the system 700) can retain the capability of functioning as a source and destination for sound as well as supply reverberation sound.

In one example, the system 700 can comprise a single speaker along with a hardware and software combination (e.g., the system 800 discussed below can retain software). Depending on the instruction provided, the system 700 can emit the commencement sound, the conclusion sound, or the reverberation sound (e.g., of different objects or of the same object). Thus, one system can function in different roles. Further, the source speaker component 210 and the destination speaker component 220 (e.g., along with the echo speaker component 310 of FIG. 3) can be one physical item that functions in different roles.

The first object in travel and the second object in travel are not the same object in travel (e.g., not the identically same object travelling at the same time) and the same can be said for the third object in travel. In one embodiment, the first object in travel and the second object in travel can be different object types (e.g., the first object is a bullet and the second object is an artillery shell). In one embodiment, the first object in travel and the second object in travel are different iterations of the same object type (e.g., the first object and second object are both water crashing as a wave—one earlier in time and one later in time).

Figure 8:
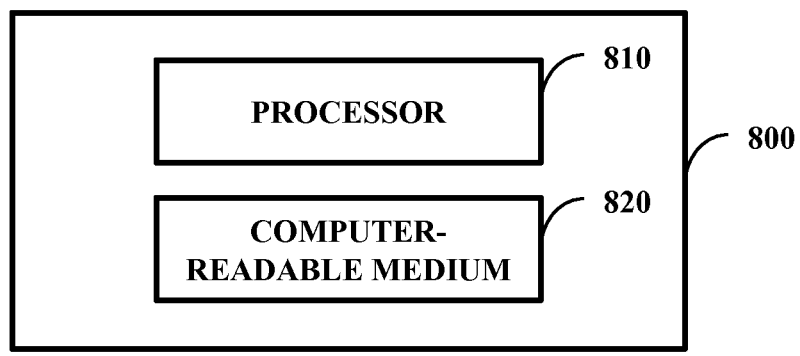
FIG. 8 illustrates one embodiment of a system comprising a processor and a computer-readable medium.

FIG. 8 illustrates one embodiment of a system 800 comprising a processor 810 and a computer-readable medium 820 (e.g., non-transitory computer-readable medium). The computer-readable medium 820 can be retained by the housing 710 of FIG. 7. In one embodiment, the non-transitory computer-readable medium 820 is communicatively coupled to the processor 810 and stores a command set executable by the processor 810 to facilitate operation of at least one component disclosed herein (e.g., the source speaker component 210 of FIG. 2 and/or the destination speaker component 220 of FIG. 2). In one embodiment, components disclosed herein (e.g., the source speaker component 210 of FIG. 2 and/or the destination speaker component 220 of FIG. 2) can be implemented, at least in part, by way of non-software, such as implemented as hardware (e.g., implemented by way of the processor 810 and/or computer-readable medium 820). In one embodiment, the non-transitory computer-readable medium 820 is configured to store processor-executable instructions that when executed by the processor 810, cause the processor 810 to perform a method disclosed herein (e.g., the methods 1200 and 1300 discussed below).

Figure 9:
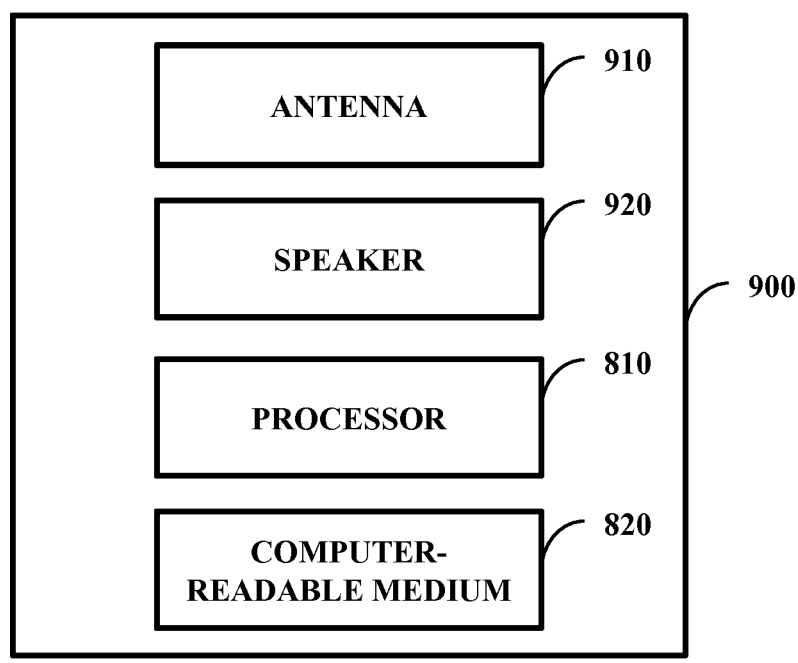
FIG. 9 illustrates one embodiment of a speaker component.

FIG. 9 illustrates one embodiment of a speaker component 900 comprising an antenna 910, a speaker 920, the processor 810, and the computer-readable medium 820. The speaker component 900 can comprise mechanical hardware to facilitate movement. The speaker component 920 can function as the source speaker component 210 of FIG. 2, the destination speaker component 220 of FIG. 2, and/or the echo speaker component 310 of FIG. 3 depending on circumstances. The antenna 910 of the speaker component 900 can wirelessly communicate with a system (e.g., a central processing system, another speaker component, etc.) and receive an instruction for a sound to be broadcast. The speaker 920 of the speaker component 900 can be used to broadcast the sound.

In one example, the antenna 910 can be in communication with a computer system that sends an instruction to play 'file A' that is retained in the computer-readable medium 820. The processor 810 can follow the instruction, access 'file A', and cause the speaker to play the sound associated with 'file A.' The speaker component 900 might not be informed if it is functioning as the source speaker component 210 of FIG. 2, the destination speaker component 220 of FIG. 2, or the echo speaker component 310 of FIG. 3. To put another way, the speaker component 900 can function without knowledge of its own role. However, 'file A' may be designated as a conclusion sound and therefore the speaker component 900 may recognize that it is functioning as the destination speaker component 220 of FIG. 2. In one embodiment, the computer-readable medium 820 can retain a sound file set for various situations, such as 'file A.' In addition, the computer-readable medium 820 can retain protocol for component operations, positional calculations, software for implementations of the graphical user interface, or software for communicating with other entities (e.g., the central processing system).

In one example, the antenna 910 can receive the instruction from the computer as well as 'file A' from the computer. Therefore, as opposed to accessing a file retained in the computer-readable medium 820, the file can be received concurrently with the instruction. 'File A' can be retained in the computer-readable medium 820 for future use such that 'file A' is not required to be sent for every use of 'file A' by the speaker component 900.

Figure 10:
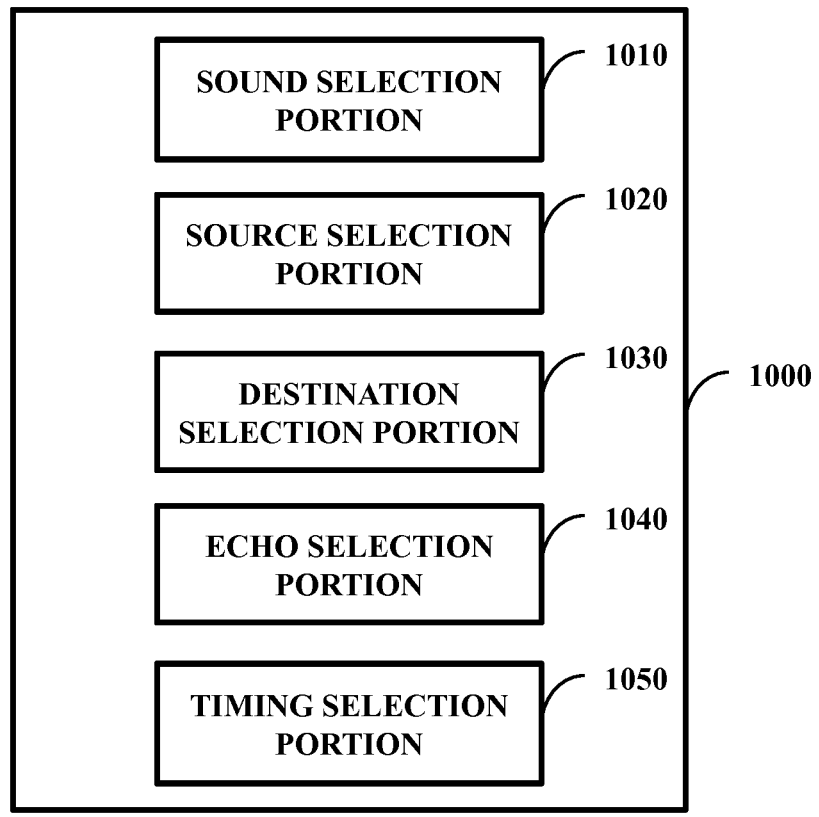
FIG. 10 illustrates one embodiment of an interface comprising a sound selection portion, a source selection portion, a destination selection portion, an echo selection portion, and a timing selection portion.

FIG. 10 illustrates one embodiment of an interface 1000 comprising a sound selection portion 1010, a source selection portion 1020, a destination selection portion 1030, an echo selection portion 1040, and a timing selection portion 1050. The interface 1000 can be a graphical user interface that is displayed on a touch screen associated with the system 800 of FIG. 8. The interface 1000 can be used by a person (e.g., an instructor) to direct the sound experience. This direction can be real-time or pre-loaded. For a pre-loaded example, a programmer can use the interface 1000 to set up a sound experience loop, such as a sound experience that is repeated for an amusement ride. For a real-time example, soldiers can be training in a complex tactical environment. This environment can have a variety of places where the soldiers can take cover. To simulate a real-world experience, enemy combatants may attempt to shoot in a direction where the soldiers are taking cover. Depending on where the soldiers take cover, sounds can be selected by a training coordinator by way of the interface 1000.

The sound selection portion 1010 can be used to select a sound to be emitted (e.g., single sound such as a single conclusion sound, sound set that comprises the commencement sound and conclusion sound, etc.). The source selection portion 1020, the destination selection portion 1030, and the echo selection portion 1040 can be used to select where the sound is to be emitted. This selection can be for a specific speaker or for an area to emit the sound (e.g., a component selects a best speaker in the area for use, or if no speaker is in the area then the component selects a speaker to move to that area via the propulsion component 520 of FIG. 5). The timing selection portion 1050 can be used to select when the sound is to be emitted. Portions of the interface 1000 can be multi-layered, such as the sound selection portion 1010 first asking whether a gun or cannon sound is to be used and if gun is selected, then a second question can be which type of gun.

While the interface 1000 is shown, it is to be appreciated by one of ordinary skill in the art that the sound experience can be proactively created. In one example, the system 800 of FIG. 8 can retain an artificial intelligence component that can make inferences and decisions. Information can be gathered (e.g., soldier movement) and based on this information, the artificial intelligence component can determine what sounds to emit, where to emit those sounds, when to emit those sounds, which speaker(s) to use, where to move at least one speaker, etc. The artificial intelligence component can be self-learning, such that the artificial intelligence component can update logic base on effectiveness of a sound experience.

Furthermore, the interface 1000 can be implemented with fewer than the portions shown and/or be used with some portions being ignored. In one example, a person can select the sound and source by way of portions 1010 and 1020 and a component can select the destination based on various factors (e.g., simulated wind speed, simulated rain, etc.). Once the interface 1000 gathers appropriate information and/or the component makes the appropriate data selection(s), the proper destinations can be identified and information can be sent (e.g., wirelessly). Example information are sound files themselves, instructions on what sound files to use, attenuation factors, time information, etc. In addition, different information can be sent to different components (e.g., a firing sound file sent to the source speaker component 210 and an impact sound file sent to the destination speaker component 220).

As an example sequence, a person can enter data by way of the portions 1010-1050. A component can calculate a plan for various components (e.g., components 210 and 220 of FIG. 2) and send data to each component in use, such that the plan can be properly implemented. The components can then use this data to implement the plan.

Figure 11:
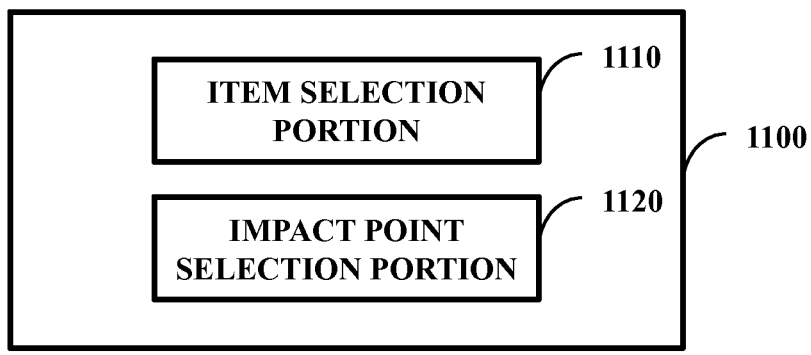
FIG. 11 illustrates one embodiment of an interface comprising an item selection portion and an impact point selection portion.

FIG. 11 illustrates one embodiment of an interface 1100 comprising an item selection portion 1110 and an impact selection portion 1120. As opposed to the detailed interface 1000 of FIG. 10, the interface 1100 can be simpler with the two portions 1110 and 1120. The item selection portion 1110 can be used to select an item (e.g., bullet, rifle, small arms, grenade, mortar, artillery, rocket, etc.) and the impact point selection portion 1120 can be used to select where the item would theoretically impact and thus indirectly select where sound is emitted, when sound is emitted, etc. In one example, the impact selection portion is a map where an administrator decides where impact should occur (e.g., anywhere on the map, select areas where a fixed speaker is located, etc.). A component can perform remaining tasks, such as deciding what physical speakers should be used to emit sound (e.g., which components to use), a timing pattern for sound emission, determining which sound file to use (e.g., three sound files that are selected—one for firing, one for impact, and one for echo), performing calculations based on administrator designations, initiate sound emission, etc. In one example, the administrator can select the item by way of portion 1110, but portion 1120 can be used to request random impact.

Figure 12:
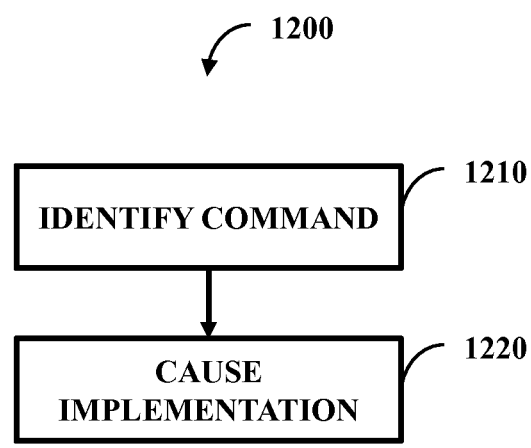
FIG. 12 illustrates one embodiment of a method comprising two actions.

FIG. 12 illustrates one embodiment of a method 1200 comprising two actions 1210 and 1220. At 1210, there is identifying an initiation command entered upon a graphical user interface (e.g., the interface 1000 of FIG. 10 or the interface 1100 of FIG. 11) for an audible sequence (e.g., one or more sounds (e.g., command sound and commencement sound), multiple sounds and lights, etc.). At 1220, causing implementation of the audible sequence in response to identifying the initiation command can occur. In one embodiment, this identification can occur at a terminal that displays the graphical user interface and the causing is sending a command. In one embodiment, this identification can occur at a speaker component remote from the terminal and causing is performing the emission of the audible sequence local to the speaker component.

In one embodiment, the initiation command comprises a location command that identifies a location from which at least part of the audible sequence is emitted. Action 1220 can include causing at least part of the audible sequence to be outputted from the location. Also, action 1220 can include causing a hardware element to move to the location and causing the audible sequence to, at least in part, be outputted after the hardware is moved to the location.

The audible sequence can comprise a firing audible portion and an impact audible portion. The firing audible portion can be implemented at a first location while the impact audible portion is implemented at a second location. The second location is distinct from the first location (e.g., they are physically separate, they are remote from one another, etc.) and the firing audible portion can be implemented earlier in time than the impact audible portion. In addition to the firing audible portion and the impact audible portion, the audible sequence can comprise an echo audible portion. The echo audible portion can be implemented at a third location that is distinct from the first location and from the second location. The echo audible portion can be implemented later in time than the impact audible portion.

Figure 13:
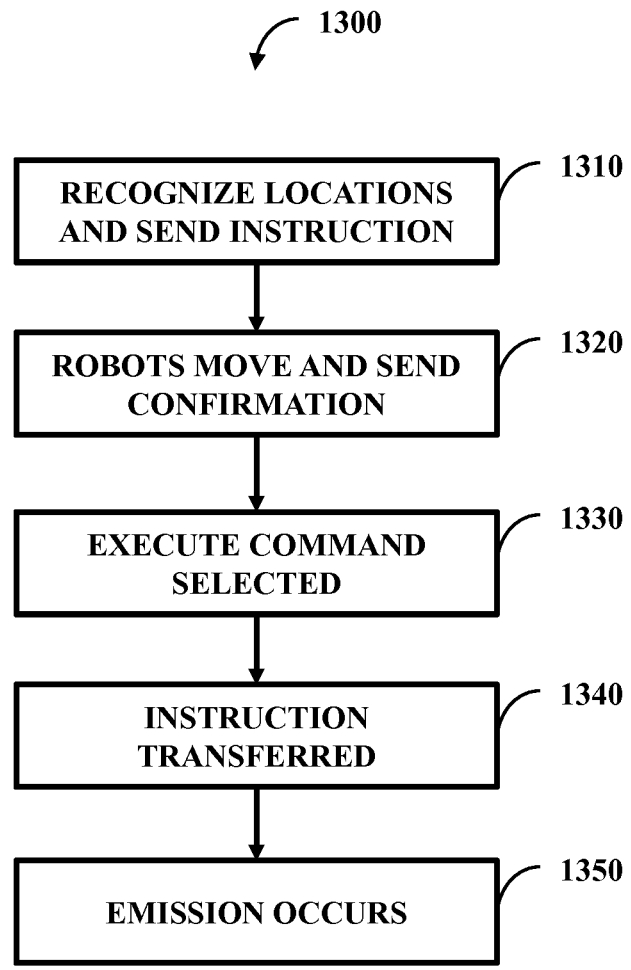
FIG. 13 illustrates one embodiment of a method comprising five actions.

FIG. 13 illustrates one embodiment of a method 1300 comprising five actions 1310-1350. By way of an interface, such as the interface 1000 of FIG. 10, a user can enter location information for one or more source speaker component 210 of FIG. 2, one or more destination speaker component 220 of FIG. 2, and/or one or more echo speaker component 310 of FIG. 3, and at 1310 this information can be recognized and sent (e.g., firing location information to the source speaker component 210 of FIG. 2). Robots that operate as these components can move to the indicated location and return a confirmation at 1320. Once appropriate confirmations are received, the interface 1000 of FIG. 10 can have an execute command portion become available, a user can press the execute command portion, and in response to this pressing, at 1330, the execute command can be selected. At 1340, an instruction to emit is transferred (e.g., with appropriate sound file information), and, at 1350, emission can occur. If appropriate confirmations are not received, a component can perform corrective action (e.g., instruct another component to move, re-send the information, etc.).

What is claimed is:

1. A system, comprising:
a source speaker component configured to cause emission of a commencement sound that communicates an initiation of an object in travel;
a destination speaker component configured to cause emission of a conclusion sound that communicates a result of the object in travel;
a monitor component configured to monitor emission of the commencement sound to produce a monitor result,
a decision component configured to decide a time to emit the conclusion sound based, at least in part, on the monitor result, and
a causation component configured to cause the destination speaker component to cause the emission of the conclusion sound at the decided time.

2. The system of claim 1,
where the causation component is configured to cause emission of a reverberation sound that communicates an echo of the object in travel, and
where the reverberation sound is emitted later in time from the conclusion sound.

3. The system of claim 1,
where the causation component is configured to cause emission of a conclusion non-sound sensory emission that communicates the result of the object in travel.

4. The system of claim 1, comprising:
where the causation component is configured to cause emission of a commencement non-sound sensory emission that communicates the initiation of the object in travel.

5. The system of claim 3, where the conclusion non-sound sensory emission is a smell emission.

6. The system of claim 3, where the conclusion non-sound sensory emission is a touch emission.

7. A system, comprising:
a source speaker component configured to emit a commencement sound that communicates an initiation of an object in travel;
a destination speaker component configured to emit a conclusion sound that communicates a result of the object in travel;
a housing configured to retain the source speaker and the destination speaker;
a reception component configured to receive a sound instruction, where the source speaker component, the destination speaker component, or a combination thereof emit their respective sound in accordance with the sound instruction; and
a propulsion component configured to cause movement of the housing to a location that is based, at least in part, on the sound instruction, where the housing retains the reception component and the propulsion component.

8. The system of claim 7, comprising:
an analysis component configured to analyze a sound instruction to produce an analysis result;
an identification component configured to identify a sound file to use from a sound file set of two or more sound files based on the analysis result;
a recognition component configured to read the sound file from a non-transitory computer-readable medium to produce a sound file result; and
an implementation component configured to cause emission of the commencement sound, the conclusion sound, or a combination thereof in accordance with the sound file result.

9. The system of claim 7, where the source speaker component and the destination speaker component share speaker hardware.

10. The system of claim 7,
where the sound instruction is received from an interface and
where the sound instruction is entered into the interface from a user.

11. The system of claim 7,
where the sound instruction is produced proactively.

12. The system of claim 7,
where the source speaker component is configured to emit a conclusion non-sound sensory emission that communicates the result of the object in travel along with the conclusion sound.
where the destination speaker component is configured to emit a commencement non-sound sensory emission that communicates the initiation of the object in travel along with the commencement sound.

13. The system of claim 7,
where an echo speaker component is configured to emit a reverberation sound that communicates an echo of the object in travel after emission of the commencement sound begins.

14. The system of claim 7, the housing comprising:
a singular housing configured to retain the source speaker component and the destination speaker component.

15. The system of claim 7, the housing comprising:
a first housing that retains the source speaker component; and
a second housing that retains the destination speaker component,
where first housing and the second housing are physically separate.

16. A method, comprising:
recognizing an emanation, from a first speaker, of a commencement sound that communicates an initiation of an object in travel to produce an observation result;
identifying a second speaker for use in emanation of a conclusion sound for the commencement sound;
observing the emanation of the commencement sound to produce an observation result;
determining, by way of a processor, a time for emanation of the conclusion sound from the identified second speaker based, at least in part, on the observation result; and
causing emanation, from the identified second speaker, of the conclusion sound at the determined time for the conclusion sound.

17. The method of claim 16, where identifying the second speaker is accomplished, at least in part, though use of the observation result.

18. The method of claim 16, comprising:
identifying a third speaker for use in emanation of a reverberation sound for the commencement sound;
determining, by way of the processor, a time for emanation of the reverberation sound; and
causing emanation, from a third speaker physically distinct from the first speaker and the second speaker, of the reverberation sound at the determined time for the reverberation sound.

19. The method of claim 16, comprising:
receiving a sound instruction;
analyzing the sound instruction to produce an analysis result; and
selecting the conclusion sound for emanation based, at least in part, on the analysis result, where identifying the second speaker is accomplished, at least in part, though use of the observation result.

20. The method of claim 16, comprising:

observing emanation, from the second speaker, of a second commencement sound that communicates an initiation of a second object in travel to produce a second observation result;

determining, by way of the processor, a second time to emanate a second conclusion sound for the second commencement sound based, at least in part, on the second observation result; and causing emanation, from the first speaker, of the second conclusion sound.

\* \* \* \* \*